P. W. SMITH.
AGRICULTURAL IMPLEMENT.
APPLICATION FILED JAN. 20, 1912.
1,076,461.
Patented Oct. 21, 1913.
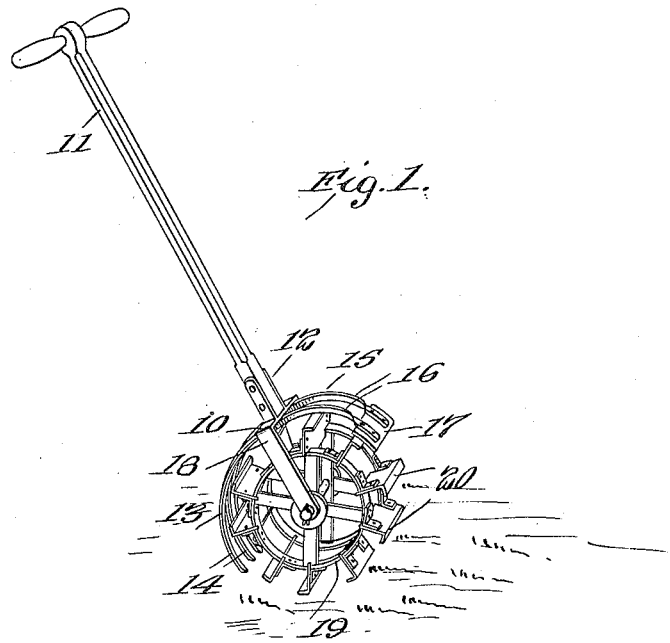
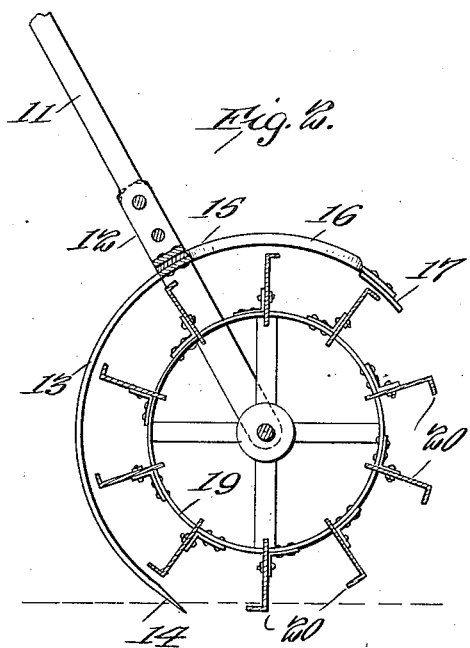
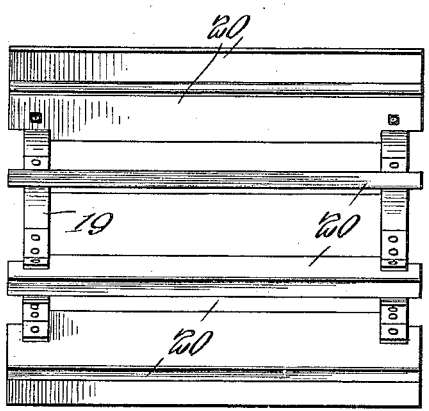
Inventor
PERRY W. SMITH
Witnesses
E. M. Callaghan
F. H. Hoster
By Victor J. Evans
Attorney

UNITED STATES PATENT OFFICE.

PERRY W. SMITH, OF PARIS, MISSOURI.

AGRICULTURAL IMPLEMENT.

1,076,461.  Specification of Letters Patent.  Patented Oct. 21, 1913.

Application filed January 20, 1912. Serial No. 672,298.

*To all whom it may concern:*

Be it known that I, PERRY W. SMITH, a citizen of the United States, residing at Paris, in the county of Monroe and State of Missouri, have invented new and useful Improvements in Agricultural Implements, of which the following is a specification.

An object of the invention is to provide an agricultural implement for use in harrowing, scraping and pulverizing the soil.

To accomplish the desired result, use is made of a frame provided with a scraping member and a harrowing member, a pulverizing wheel mounted to revolve on the frame between the said scraping and harrowing members and a handle connected to the said frame, the said harrowing member being moved into operable position when the handle is inclined toward one side of the said wheel and the said scraping member being moved into operable position when the said handle is inclined toward the other side of the said wheel.

In the further disclosure of the invention, reference is had to the accompanying drawings, forming a part of this specification, in which similar characters of reference denote corresponding parts in all the views and in which:—

Figure 1 is a perspective view of my device. Fig. 2 is a vertical sectional view. Fig. 3 is a front elevation of the wheel.

Referring more particularly to the views, I provide a frame 10, having secured thereto a handle 11, a suitable socket 12 being provided on the frame 10 to rigidly accommodate one end of the said handle. Carried by the frame 10 and extending from one side thereof is a harrowing member 13, consisting of spaced prongs 14 and carried by the said frame and extending from the other side thereof is a scraping member 15, consisting of curved depending bars 16 having a scraper plate 17 formed on the lower ends thereof.

A plurality of depending bearing rods 18 are formed integrally with the frame 10 and mounted to rotate on the lower ends thereof is a pulverizing wheel 19, the said wheel being interposed between the harrowing member 13 and the scraping member 15, a series of radially extending paddles 20 being formed on the periphery of the wheel 19.

In the use of my device, when it is desired to till the soil, the operator grasps the handle 11 and inclines the same toward that side of the frame on which the harrowing member 13 is formed. Thus, it will be seen that the prongs 14 will be moved in engagement with the soil to penetrate the surface thereof. Now, as the device is moved along the ground, the paddles 20 will also penetrate the soil and as the wheel 19 revolves the mentioned paddles will take up particles of the soil, which particles will become sifted or pulverized by the revolving action of the wheel, while at the same time the prongs 14 of the harrowing member 13, extending into the soil, will rake or harrow the soil to separate or disintegrate lumps of soil and also raise to the surface any stones that may be contained in the soil.

When the operator swings the handle 11 toward that side of the frame 10 on which the scraping member 15 is formed the scraper plate 17 will engage the surface of the soil and scrape therefrom any weeds or other foreign substances that may be reposing or growing upon the surface of the ground, it being understood, that the wheel 19, together with the paddles 20, not only pulverizes the soil but also acts as a traction member to facilitate the operation of my device over the ground, the mentioned wheel 19, in its entirety, being sufficiently large to space the harrowing member 13 and the scraping member 15 from the ground when the handle 11 is arranged in vertical position.

Although I have shown and described my device as a manually operative mechanism, it will be readily understood that various attachments can be secured to the handle 11 for the purpose of connecting my device to various agricultural machines such as plows and the like.

I claim:—

In a device of the class described, the combination with a frame, of a handle carried thereby, a harrowing member supported on the frame on one side of the handle, a scraping member supported on the frame on the other side of the handle, and a pulverizing wheel journaled on the frame to rotate thereon, the said wheel being arranged between the said scraping member and said harrowing member, with the said harrowing and scraping members spaced from the wheel and partially encircling the same.

In testimony whereof I affix my signature in presence of two witnesses.

PERRY W. SMITH.

Witnesses:
CHAS. L. DRY,
M. K. CURTRIGHT.

Copies of this patent may be obtained for five cents each, by addressing the "Commissioner of Patents, Washington, D. C."